United States Patent [19]

Redston et al.

[11] Patent Number: 4,540,155
[45] Date of Patent: Sep. 10, 1985

[54] FLUID CONTROL VALVES

[75] Inventors: Hugh W. Redston, Alperton; James C. Potter, London, both of England

[73] Assignee: Lucas Industries, public limited company, Birmingham, England

[21] Appl. No.: 578,128

[22] Filed: Feb. 8, 1984

[30] Foreign Application Priority Data

Feb. 26, 1983 [GB] United Kingdom ............... 8305408

[51] Int. Cl.³ .......................................... F16K 31/02
[52] U.S. Cl. ................................. 251/129.20; 251/77
[58] Field of Search ................. 251/129, 141, 77, 79, 251/85–87, 138; 310/19, 23; 335/258, 273

[56] References Cited

U.S. PATENT DOCUMENTS

| 297,937 | 4/1884 | Johnson | 251/129 |
| 4,268,009 | 5/1981 | Allen | 251/245 |
| 4,285,497 | 8/1981 | Güttel | 137/625.65 |
| 4,449,691 | 5/1984 | Führer et al. | 251/129 |

FOREIGN PATENT DOCUMENTS 1204326 11/1958 France ............................ 251/138

Primary Examiner—Samuel Scott
Assistant Examiner—Noah Kamen

[57] ABSTRACT

A fluid control valve comprises a valve member movable in a bore in a valve body. The valve has a stem connected through a resilient member to the armature of an electromagnetic device. The travel of the armature is greater than the movement of the valve member, the additional movement of the armature causing flexure of the resilient member.

5 Claims, 5 Drawing Figures

FLUID CONTROL VALVES

BACKGROUND OF THE INVENTION

This invention relates to electromagnetically operable fluid control valves more particularly but not exclusively, for use in fuel injection pumping apparatus of the kind intended to supply fuel to an internal combustion engine.

There is an increasing demand in the field of fuel injection equipment for valves which can be operated at high repetition rates and which can handle fuel at high pressures. The reason for this is that electronic control equipment is better able to take into account various engine operating parameters and desired operating parameters than for example mechanical or hydraulically actuated equipment. Such valves will in use, be expected to operate for extended periods without service and will operate at high repetition rates.

SUMMARY OF THE INVENTION

The object of the invention is to provide a fluid control valve in a simple and convenient form.

According to the invention an electromagnetically operable fluid control valve comprises a valve member axially movable in a valve body, an electromagnetic device including an armature, coupling means connecting said armature to the valve member whereby when the device is energised the valve member will be moved to a closed position, the movement of the valve member between its open and closed position being less than the movement of the armature, resilient means biasing the valve member to the open position, said coupling means comprising a resilient member one part of which is rigidily coupled to said valve member, the other part of the resilient member being acted upon by the armature when the device is energised, the force which can be transmitted through said resilient member being sufficient to move the valve member against the action of the resilient means to the closed position but to allow continued movement of the armature to the limiting position thereof, stop means for limiting the movement of the valve member under the action of said resilient means and thereby defining the open position of the valve member, and further means for limiting the movement of the armature away from its limiting position.

DESCRIPTION OF THE PREFERRED EMBODIMENTS

Figure 1:
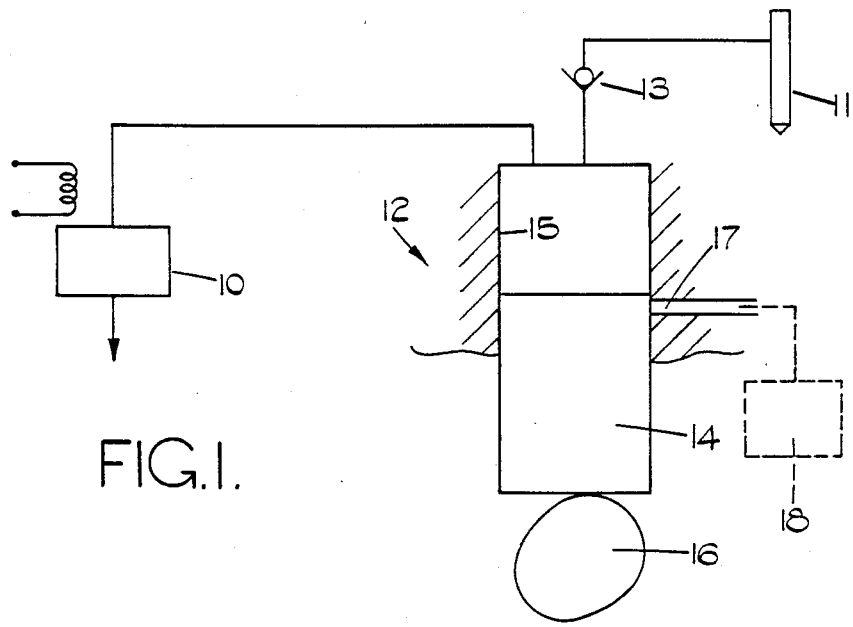
FIG. 1 is a block diagram of a fuel pumping apparatus incorporating a valve.

Referring to FIG. 1 of the drawings the electromagnetically operated valve is shown at 10 and is incorporated in a fuel pumping apparatus for supplying fuel to an injection nozzle 11 of a compression ignition engine. Fuel under pressure is supplied by a cam operated fuel pump 12, the pumping chamber of which is connected to the injection nozzle 11 which connection may include a non-return delivery valve 13. The pumping chamber can also be placed in communication with a drain by way of the valve 10.

The pump 12 includes a piston 14 movable inwardly to displace fuel from the cylinder 15 in which it is located, by means of an engine driven cam 16. Outward movement of the plunger is effected by the action of a spring not shown. Formed in the wall of the cylinder is a fuel supply port 17 which is connected to a source 18 of fuel at a low pressure and in use, as the plunger is moved inwardly with the valve 10 closed, fuel will be displaced to the nozzle 11 by way of the delivery valve as soon as the part 17 is covered by the plunger. If during eh inward movement of the plunger the valve 10 is opened, fuel will flow to a drain by way of the valve rather than to the nozzle. The valve 10 may be opened during the initial movement of and closed when the plunger has moved inwardly to a predetermined position. The length of stroke of the plunger 14 after the port 17 is closed and while the valve 10 is closed determines the amount of fuel supplied to the injection nozzle.

Figure 2:
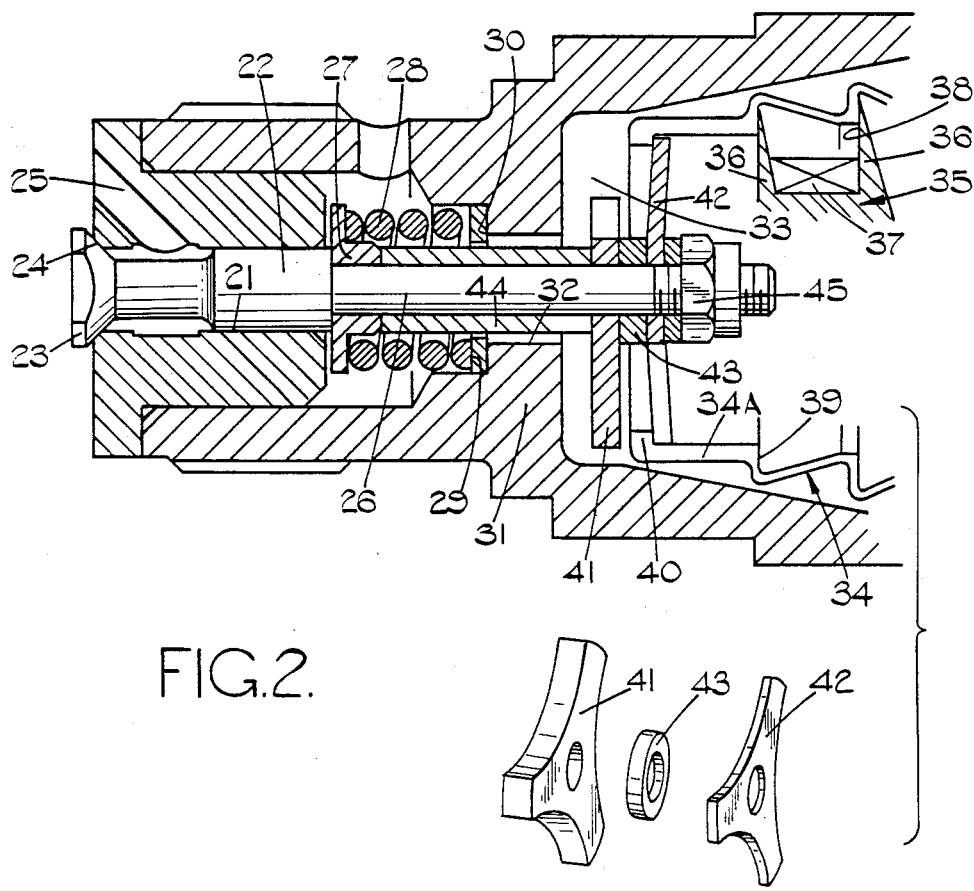
FIGS. 2–5 show different examples of valve.

Referring to FIG. 2 of the drawings the valve 10 includes a valve body 22 in which is formed a bore 21 extending therethrough. The valve member 22 is slidable within the bore and has a head 23 engageable with a seating 24 defined at the end of the bore. The valve member is of reduced diameter behind the seating to define with the bore 21 an annular space with which communicates a passage 25 in the valve body. The passage 25 in use communicates with the pumping chamber and as shown in FIG. 2, the valve member is in the closed position with the head 23 in sealing engagement with the seating 24.

In the closed position of the valve member the latter extends a short distance beyond the end of the bore remote from the seating and mounted about a stem 26 formed integrally with the valve member, is a collar 27. As will be explained, the collar 27 is fixed relative to the stem and it therefore acts in conjunction with the end of the valve body, to determine the movement of the head away from the seating.

The collar 27 serves as an abutment for one end of a coiled compression spring 28 the other end of which engages a shim 29 located between the spring and a step 30 which is formed on a housing 31 in the end of which the valve body is located. The housing is screw threaded for engagement within the pump body and it is provided with an opening 32 through which the stem 26 extends into a chamber 33. The chamber 33 accommodates an electromagnetic device which includes a hollow armature 34 and a stator structure 35. The stator structure defines a plurality of circumferentially extending pole pieces 36 between which are located grooves accommodating electrical windings 37 connected so that when electrical current flows therethrough, adjacent pole pieces 36 will assume opposite magnetic polarity. Each pole piece 36 defines a pole face 38 which faces a pole face 39 formed on the armature.

The armature defines at the end of a right cylindrical portion 34A, an inwardly extending flange 40 which is sandwiched between a rigid plate 41 and a plate like resilient member 42. The plate 41 and the resilient member 42 are located about the stem but are spaced by means of a shim 43. The plate 41 and the collar 27 are held in spaced relationship by means of a sleeve 44 and the various parts are held in assembled relationship by a threaded nut 45 which is engaged with a threaded portion of the stem.

In the valve closed position as shown, the armature assumes a limiting position with the pole faces 38 and 39 in contact. The force exerted by the spring 28 is determined by the thickness of the shim 29 and the force exerted by the resilient member 42 upon the flange 40 of the armature is determined by the thickness of the shim 43. As shown in FIG. 2 the valve is closed and is held in the closed position against the action of the spring 28, by the fact that the windings 37 are energised. When the windings are deenergised the spring 28 effects movement of the valve member to the open position, the open position being determined by contact of the collar 27 with the end of the valve body 20. When the windings are energised movement in the reverse direction takes place and the force exerted upon the valve member and the associated parts is transmitted through the resilient member 42. This member may flex slightly during such movement but its real purpose is to allow continued movement of the armature when the valve head 23 engages the seating to allow the pole faces 36, 39 to move into contact. However, the member 42 does act to minimise the impact loading on the valve head and seating. FIG. 2 shows also a perspective view of the plate 41, the shim 43 and the resilient member 42. The plate and the resilient member are provided with deep scallops to reduce their mass. It will be observed that the armature is located in the radial direction by means of the resilient member and therefore is not provided with a bearing of its own although such a bearing will be provided at the opposite end of the armature. The initial air gap between the pole faces when the valve is open is set by the length of the sleeve 44. The plate 41 is engaged by the flange 40 in the open position of the valve.

Figure 3:
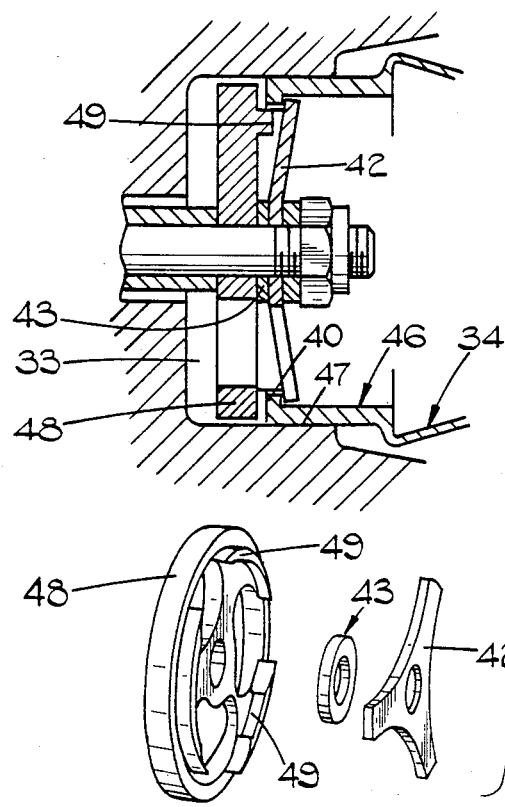

FIG. 3 shows a modification to the example of FIG. 2 and in this case the right cylindrical portion 46 of the armature 34, forms a bearing with a right cylindrical surface 47 forming a wall of the chamber 33. A radial clearance is provided between the portion 46 of the armature and the spokes of the member 42. Furthermore, a small clearance exists between the peripheral surface of the plate 48 and the surface 47, the plate in this example being provided with an axially extending flange or flanges 49 positioned inwardly of the flange 40 of the armature, which are engaged by the member 42 when the valve is open.

Figure 4:
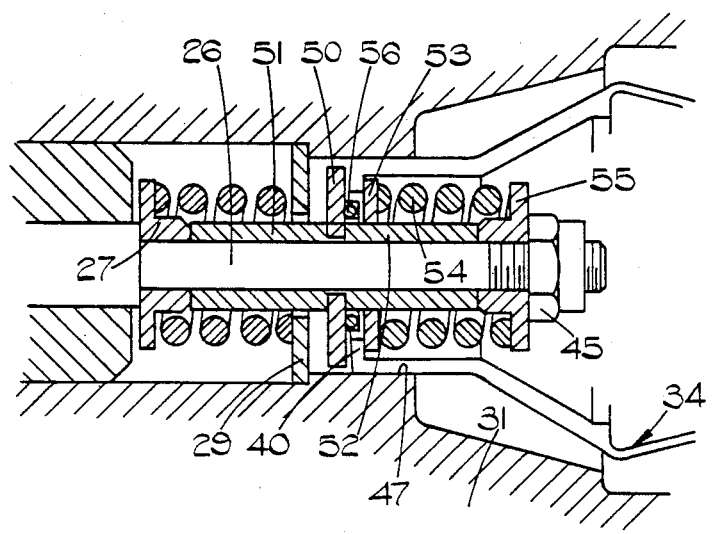

Referring to FIG. 4, this shows a control valve which incorporates features of the examples of valves shown in FIGS. 2 and 3 but which incorporates an alternative arrangement for the resilient member 42 of the earlier examples. Parts which have the same function are assigned the same reference numerals. Referring to FIG. 4 the flange 40 on the armature locates between a plate 50 which is secured about the stem 26 by the fact that it is trapped between a pair of sleeves 51, 52. A further plate 53 is slidable about the sleeve 52 against the action of a coiled compression spring 54 which bears against the plate 53 at one end and which at its other end engages a spring abutment 55 which is secured to the stem 26. The extent of movement of the plates 50 and 53 towards each other is limited by a distance member or shim 56. During movement of the valve member of the closed position, when the head 23 engages the seating 24 limited movement of the armature can continue to take place against the action of the spring 54 to allow the pole faces of the armature to engage the pole faces of the stator structure. In this example the initial air gap between the pole faces 38 nd 39 in the open position of valve, is determined by adjustment of the stator structure 35 within the housing 31.

Figure 5:
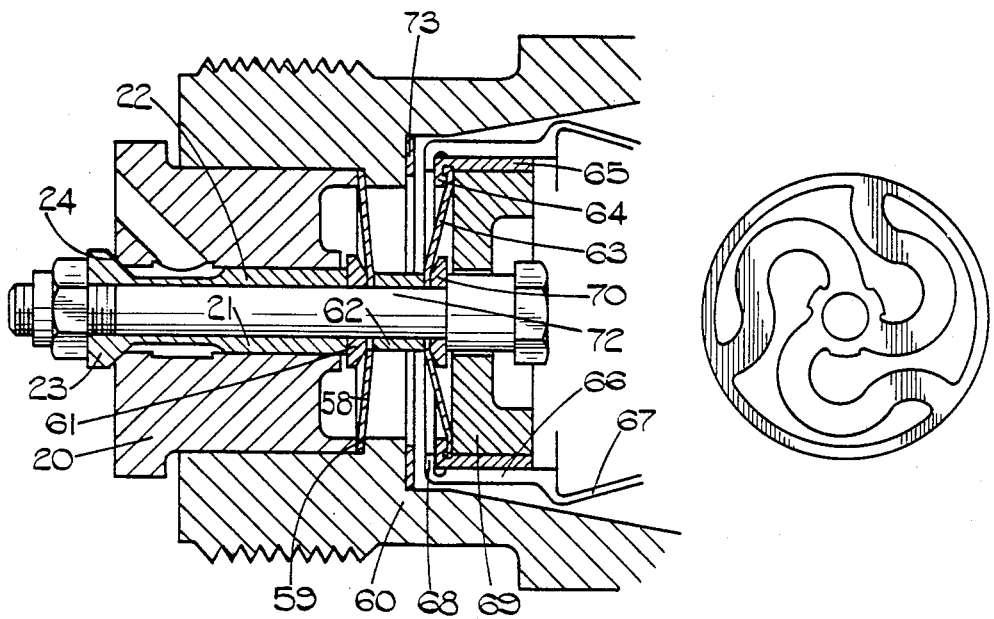

Referring now to FIG. 5, the valve body is indicated at 20 with its bore 21 containing a valve member 22 which in this example is of hollow form but which defines a head 23 for co-operation with a seating 24. The valve member 22 extends slightly beyond the end of the bore as with the example of FIG. 2. The spring for moving the valve member to the open position is a diaphragm spring referenced 58 the peripheral surface of which is trapped between the valve body 20 and a step 59 in the housing 60. Located between the spring and the valve member is a collar or shim 61 the thickness of which can be chosen to set the force exerted by the spring 58. The shim 61 also co-operates with the adjacent end of the valve body, to limit the extent of movement of the valve head 23 from the seating 24.

Located against the spring 58 is a collar 62 which bears against a further diaphragm spring 63. The peripheral surface of the spring 63 is located against the inwardly extending flange 64 of a hollow cylindrical locating member 65 about which a hollow cylindrical part 66 of the armature 67 is located. The part 66 defines an inwardly extending flange 68 which as will be explained can engage with the part 65 when the windings are energised. The outer peripheral surface of the spring 63 is trapped between the flange 64 and a member 69 which can be inserted and secured within the member 65 once a shim 70 has been located in position against the spring. The valve member 22, the shims 61 and 70, the collar 62 and the springs are held in assembled relationship by means of a tie bolt 72 which extends through the valve member. The vavle is shown in the energised condition and in this condition no clearance exists between the pole faces on the armature and those on the stator. When the windings are deenergised, the diaphragm spring 58 effects movement of the movable parts towards the left as seen in the drawing thereby to lift the valve head 23 from the seating 24. The extent of movement of the valve member is determined by the abutment of the shim 61 with the end of the valve body but the movement of the armature can continue until it is brought to rest by the abutment of the flange 68 with a shim 73 which is positioned in the path of the flange 68 and which is located against a step defined in the wall of the chamber in the valve housing. The spring 63 serves to permit additional movement of the armature when the valve head 23 engages the seating 24. It therefore acts in the same manner as the resilient member 42 in the examples of FIGS. 2 and 3 and the spring 54 of the example shown in FIG. 4. FIG. 5 also shows in end view, a suitable form of diaphragm spring.

We claim:

1. An electromagnetically operable fluid control valve comprising a valve body, a valve member movable in a bore in the valve body between open and closed positions, a stem extending from the valve member, a collar mounted about said stem, a coiled compression spring mounted about said stem, one end of the coiled compression spring engaging said collar to urge the valve member to an open position as determined by the abutment of said collar with the valve body, a rigid plate secured to said stem and a plate-like resilient member secured to said stem in spaced relation to said rigid plate and on the side thereof remote from the valve member, a hollow axially movable armature having an inwardly directed flange which is located between said rigid plate and said resilient member, a stator structure within said armature, and electrical windings carried by said stator structure, said armature having a travel greater than that of the valve member, whereby when said windings are energised the force exerted on the armature will be transmitted to said valve stem through said resilient member to cause movement of the valve member to the closed position, said resilient member deflecting when the valve member is in the closed position to allow continued movement of the armature to a limit position.

2. A fluid control valve according to claim 1 including annular pole faces defined by said stator structure and complementary pole faces defined by said armature, the pole faces of the armature and stator structure abutting to define said limit position.

3. A fluid control valve according to claim 1 including a sleeve mounted about said stem and located between said collar and said rigid plate, a shim mounted between said rigid plate and said resilient member, and a screw threaded nut mounted at the end of the valve stem remote from the valve member, said nut acting to retain said collar, said sleeve, said rigid plate, said shim and said resilient member in assembly.

4. A fluid control valve according to claim 1 in which an edge of said resilient member is spaced from an internal surface of said armature, an external surface of said armature engaging an internal surface of a housing mounting said valve body.

5. A fluid control valve according to claim 1 in which said resilient member and said rigid plate have scallops formed in their external surface to reduce the weight thereof.

* * * * *